United States Patent [19]

Nakano

[11] Patent Number: 5,146,579
[45] Date of Patent: Sep. 8, 1992

[54] DATA PROCESSING APPARATUS
[75] Inventor: Hirotaka Nakano, Tokyo, Japan
[73] Assignee: NEC Corporation, Tokyo, Japan
[21] Appl. No.: 837,602
[22] Filed: Feb. 21, 1992

Related U.S. Application Data

[63] Continuation of Ser. No. 340,490, Apr. 19, 1989, abandoned.

[30] Foreign Application Priority Data

Apr. 25, 1988 [JP] Japan .................................. 63-100249

[51] Int. Cl.⁵ ................................................ G06F 9/30
[52] U.S. Cl. .................................. 395/425; 364/262.8; 364/946.6
[58] Field of Search .................. 364/DIG. 1, DIG. 2; 395/400, 425, 725

[56] References Cited

U.S. PATENT DOCUMENTS 4,672,538 6/1987 Takane .................................. 364/900
4,864,493 9/1989 Kishi .................................... 364/200

Primary Examiner—David Y. Eng
Attorney, Agent, or Firm—Foley & Lardner

[57] ABSTRACT

A data processing apparatus includes segment and page descriptors as a control structure for realizing a logical address, a step counter, and a count control means. The step counter is incremented or decremented every time a machine instruction is executed. The count control means causes the step counter to count or stop counting in accordance with data in the segment or page descriptor of a segment or page in which a machine instruction to be executed is present.

1 Claim, 1 Drawing Sheet

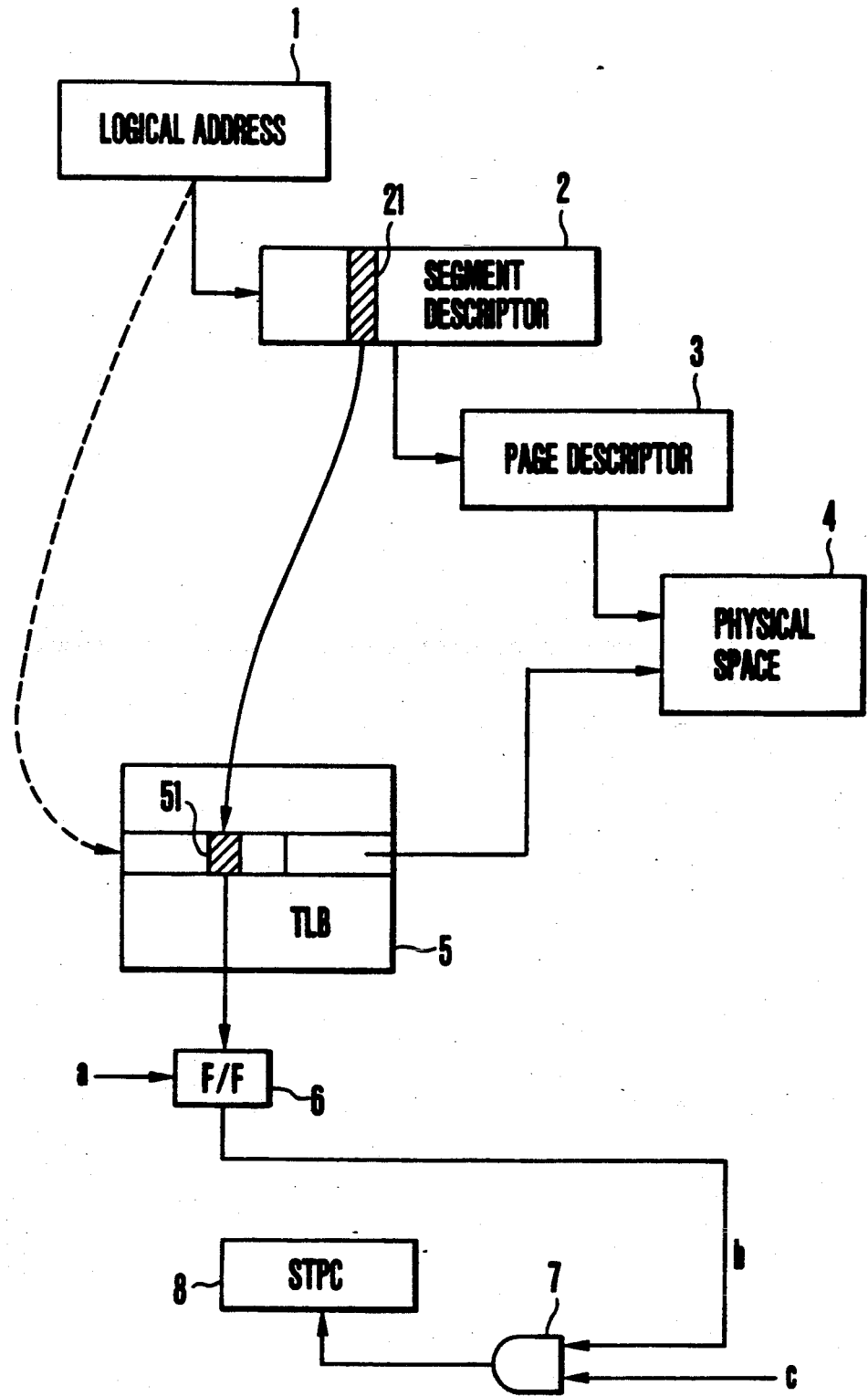

DATA PROCESSING APPARATUS

This application is a continuation of application Ser. No. 07/340,490, filed Apr. 19, 1989, now abandoned.

BACKGROUND OF THE INVENTION

The present invention relates to count control of a step counter for a data processing apparatus.

Recently, as the application field of digital computers has been greatly extended, users' demands for functions have been diversified. Consequently, operating systems for software have become very complicated. For this reason, structural analysis of an operating system cannot be performed only by desk work. As a means for performing this structural analysis, a step counter for counting a dynamic execution number of machine instructions is sometimes incorporated in a data processing apparatus.

In such a conventional data processing apparatus, a step counter counts machine instructions in units of processes. However, since a program for software generally has a hierarchical structure using subroutines, when minute analysis such as structural analysis of a specific subroutine is to be performed, a count control instruction for causing a step counter to count or stop counting is inserted in the software program in advance.

Since the above-described conventional step counter counts machine instructions in units of processes, when minute structural analysis is to be performed, a count control instruction for causing a step counter to count or stop counting must be inserted in a program for software in advance. Therefore, the conventional step counter has poor flexibility, and the processing speed is decreased.

SUMMARY OF THE INVENTION

The present invention has been made in consideration of the above situation, and has as its object to provide a data processing apparatus which can flexibly specify an object to be measured without degrading the performance of the apparatus.

In order to achieve the above objective, there is provided a data processing apparatus including segment and page descriptors as a control structure for realizing a logical address, comprising a step counter to be incremented or decremented every time a machine instruction is executed, and count control means for causing the step counter to count or stop counting in accordance with data in the segment or page descriptor of a segment or page in which a machine instruction to be executed is present.

BRIEF DESCRIPTION OF THE DRAWING

FIG. 1 is a block diagram showing an arrangement of a data processing apparatus according to an embodiment of the present invention.

DETAILED DESCRIPTION OF THE PREFERRED EMBODIMENT

FIG. 1 shows an arrangement of a data processing apparatus according to an embodiment of the present invention. Referring to FIG. 1, reference numeral 1 denotes a logical address; 2, a segment descriptor; 3, a page descriptor; 4, a physical space; 5, a TLB (Translation Look-aside Buffer); 6, a flip-flop (F/F); 7, an AND gate; and 8, a step counter (STPC).

The data processing apparatus of this embodiment comprises the segment and page descriptors 2 and 3 as a control structure for realizing the logical address 1. Count control data 21 for causing the step counter 8 to count or stop counting is included in the segment descriptor 2.

Translation of the logical address 1 into a physical address is performed by an address translating section of the data processing apparatus through the control structure constituted by a "table" consisting of the segment and page descriptors 2 and 3 and the like which are present in a main storage. The TLB 5 is arranged in the apparatus in order to perform this translation at high speed.

Information 21 present in the segment descriptor 2 is one of the types of information which are representative of the characteristics of the segment and is count control information for causing the step counter 8 to count or stop. In the present invention, the count control information 21 is one-bit information and indicates the step counter update mode when this bit is "ON" and the step counter update suppression mode when this bit is "OFF".

Where the conversion of the logical address 1 into a physical address is effected through the medium of a control structure comprises of the "Table" describing the segment descriptor 2 and page descriptor 3, the count control information 21 is also registered as information 51 in TLB 5, along with that logical address and the corresponding physical address. Since, upon the conversion of a logical address 1 into a physical address, the logical address in question is registered in TLB 5, the corresponding physical address and counter control information can be determined immediately by reading TLB 5.

When program read is carried out, a program read signal a is generated. The program read signal a serves as a set signal for the flip-flop 6. When the signal a is generated, count control information of a segment to be executed is read from the information 51 in TLB 5, set into the flip-flop 6 and held until the next program read proceeds. The output of the flip-flop 6 constitutes one input data b to the AND circuit 7. When a machine instruction start signal c is supplied to the AND gate 7, if data stored in the flip-flop 6 is "ON" data, the step counter 8 is incremented or decremented. If the stored data is "OFF" data, incrementation or decrementation of the step counter 8 is not performed. Count control of the step counter 8 is performed by data in the segment descriptor 2 in this manner.

In this embodiment, count control data for causing the step counter 8 to count or stopping counting is present in the segment descriptor 2. However, the present invention can be equally applied to a case wherein this data is present in the page descriptor 3.

As has been described above, according to the present invention, count control for causing a step counter (which is incremented or decremented every time a machine instruction is executed) to count or stop counting is performed by using data in a segment or page descriptor. Therefore, an object to be measured can be flexibly specified, and the present invention can be easily used for, e.g., structural analysis of an operating system without degrading the performance of the apparatus.

What is claimed is:

1. A data processing apparatus that executes machine instructions, comprising:

segment and page descriptors as a control structure for realizing a logical address;

a step counter for counting the number of machine instructions executed;

count control information contained in one of said segment and page descriptors;

count control means for causing said step counter to be incremented or decremented each time said machine instruction is executed when said count control information designates counting of said step counter and for preventing said step counter from counting even during execution of machine instructions when said count control information designates topping of said counter.

* * * * *